Patented Oct. 29, 1935

2,019,449

UNITED STATES PATENT OFFICE 2,019,449

METHOD OF MAKING CONSTRUCTIONAL MATERIAL

Albert C. Fischer, Chicago, Ill., assignor to The Philip Carey Manufacturing Company, a corporation of Ohio No Drawing. Original application October 16, 1925, Serial No. 62,907. Divided and this application December 3, 1928, Serial No. 323,582

4 Claims. (Cl. 18—47.5)

This application is a division of my application Serial No. 62,907, which matured into Patent No. 1,694,212, December 4, 1928.

The material herein described is suitable for use as a protection course between construction elements and is a substitute for built-up membrane waterproofing. This material in still thicker dimensions is adapted for use as planking, as a waterproof board for purposes such as rail filler, blocked brick, crossings, industrial flooring, roof decking, sidewalk covering, waterproofing slabs, waterproofing cushion between paving elements, and stair treads, in fact any constructional material which can be extruded or rolled in strips which are relatively thick as distinguished from such sheet material as saturated felt or composition roofing. This invention relates chiefly to strips and blocks relatively thick, which blocks may reach 2 to 3 inches in thickness.

By building up a structure of this material and incorporating same in a mass of ductile substance, a laminated form can be created, so that the mass when rolled in sheets has the appearance of a shale-like formation containing repeated layers of strip-like particles which spread themselves over small areas of the ductile substance, lending strength thereto.

My invention relates particularly to the utilization of raw materials which enable one to prepare this mass at a very small cost by using raw materials which now constitute waste, and other materials which are left on the ground to rot or are used as fuel.

I am particularly referring to corn husks, which may be cut in small sections or strips, say ½" x 2" in length, or any convenient size, so that the dried corn husk or shreaded pieces of corn husk will act as a strengthening means to a ductile mass, over which it may be laid or in which it may be incorporated. In this mixture may be other subdivided fibrous material, or the husks may be incorporated in a green state in the mass, or may be incorporated in a dried state. Care must be exercised that the ductile material is not too hot, in order not to char the husk material. This necessitates heating to a temperature, or incorporating the husks at a temperature which will not char the vegetable matter. An elastic substance may also be used which becomes ductile at warmer temperatures, permitting the materials cited to be incorporated therein.

A suitable formula for preparing this mass before rolling into a flat sheet is that of 30 per cent husk material and 70 per cent ductile material. Another formula is that of 20 per cent husk material, 10 per cent subdivided fibrous material and 70 per cent ductile material. This material may be either extruded into flat sheet form or it may be pressed between suitable rolls into flat sheet form, or may be drawn between belts to a flat sheet form. The structure of the mass would be different under the three operations. By extruding the mass a general mixture would be obtained, flat husk-like particles spreading in every direction. Likewise the fibrous matter spreading in every direction.

If drawn between rolls with belts, the mass would straighten itself out into flat laminated layers caused by the inflow of the ductile substance between belts. Likewise the fibrous matter would have a tendency to straighten itself out, causing a flow of the fibrous matter and the flake-like particles in a longitudinal direction.

This laminated structure so created is a desirable feature, as it increases the area of flat surface which the flat husk particles come in contact with, thus adding strength to that ductile mass or the area of such mass with which the flat husk particles come in contact.

When pressed between rolls without belts, the formation is pretty much the same as obtained by pressing the mass between rolls with belts. All three forms of mechanical devices are on the market, so that it is not necessary to describe in detail the machinery as extrusion machines, pressing rolls and belted rolls are easily obtainable.

The invention and art involved are in the use of the materials in their particular shape and in the results obtained by the use of the respective classes of machinery. To my knowledge there is no product on the market in which the result is obtained that is obtained by this mixture, and therefore I claim as original and new, constructional material as described above.

I claim:

1. The method of making compressible and expansible strips characterized by mixing a mass of ductile waterproofing binder, vegetable reenforcing elements of relatively large surface areas, and finely divided fibers; and forming the mass into a sheet between belts.

2. The method of making compressible and expansible joints characterized by mixing a mass of ductile waterproofing binder, vegetable reenforcing elements of relatively large surface areas, and finely divided fibers; and feeding same between moving belts to form a strip in which the vegetable elements are arranged in a longitudinal direction.

3. The method of making reenforced constructional material comprising mixing a mass of ductile waterproofing binder and reenforcing elements of relatively long length, and forming the mass into sheets with the reenforcing elements disposed in a longitudinal direction.

4. The method of making reenforced constructional material consisting in mixing a mass of ductile waterproofing binder and reenforcing elements of relatively long length, and forming the mass into sheets with the reenforcing elements disposed in a longitudinal direction.

ALBERT C. FISCHER.